United States Patent [19]
Rahman et al.

[11] Patent Number: 5,991,456
[45] Date of Patent: Nov. 23, 1999

[54] METHOD OF IMPROVING A DIGITAL IMAGE

[75] Inventors: Zia-ur Rahman; Daniel J. Jobson; Glenn A. Woodell, all of Newport News, Va.

[73] Assignees: Science and Technology Corporation, Hampton, Va.; The United States of America as represented by the Administrator of the National Aeronautics and Space Administration, Washington, D.C.

[21] Appl. No.: 08/654,840

[22] Filed: May 29, 1996

[51] Int. Cl.$^6$ ........................................ G06K 9/40
[52] U.S. Cl. .................. 382/254; 382/260; 382/274; 382/279; 358/448; 358/530
[58] Field of Search ..................... 382/254, 260, 382/274, 162, 279; 358/447, 448, 461, 530, 532

[56] References Cited

U.S. PATENT DOCUMENTS

| | | | |
|---|---|---|---|
| 4,282,510 | 8/1981 | Southgate | 382/279 |
| 4,908,644 | 3/1990 | Shindo et al. | 382/279 |
| 4,947,446 | 8/1990 | Jutand et al. | 382/279 |
| 5,128,706 | 7/1992 | Shindo et al. | 382/279 |
| 5,640,469 | 6/1997 | Lewins et al. | 382/274 |

OTHER PUBLICATIONS

E.H. Land, "Color Vision and The Natural Image," Proc. Nat. Acad. Sci., vol. 45, pp. 115–129, 1959.

E.H. Land, "An Alt. Tech. for the Comp. of the Des. in the Retinex Th. of Color Vision," Proc. NAS, vol. 83, pp. 3078–3080, 1986.

A. Moore et al., "Real–Time Neural Sys. for Color Const.," IEEE Trans. Neur. Net., vol. 2, pp. 237–247, 1991.

*Primary Examiner*—Thomas D. Lee
*Attorney, Agent, or Firm*—Peter J. Van Bergen

[57] ABSTRACT

A method of improving a digital image is provided. The image is initially represented by digital data indexed to represent positions on a display. The digital data is indicative of an intensity value $I_i(x,y)$ for each position (x,y) in each i-th spectral band. The intensity value for each position in each i-th spectral band is adjusted to generate an adjusted intensity value for each position in each i-th spectral band in accordance with $$\sum_{n=1}^{N} W_n(\log I_i(x,y) - \log[I_i(x,y) * F_n(x,y)]), i = 1, \ldots, S$$

where S is the number of unique spectral bands included in said digital data, $W_n$ is a weighting factor and "$*$" denotes the convolution operator. Each surround function $F_n(x,y)$ is uniquely scaled to improve an aspect of the digital image, e.g., dynamic range compression, color constancy, and lightness rendition. The adjusted intensity value for each position in each i-th spectral band is filtered with a common function and then presented to a display device. For color images, a novel color restoration step is added to give the image true-to-life color that closely matches human observation.

14 Claims, 3 Drawing Sheets

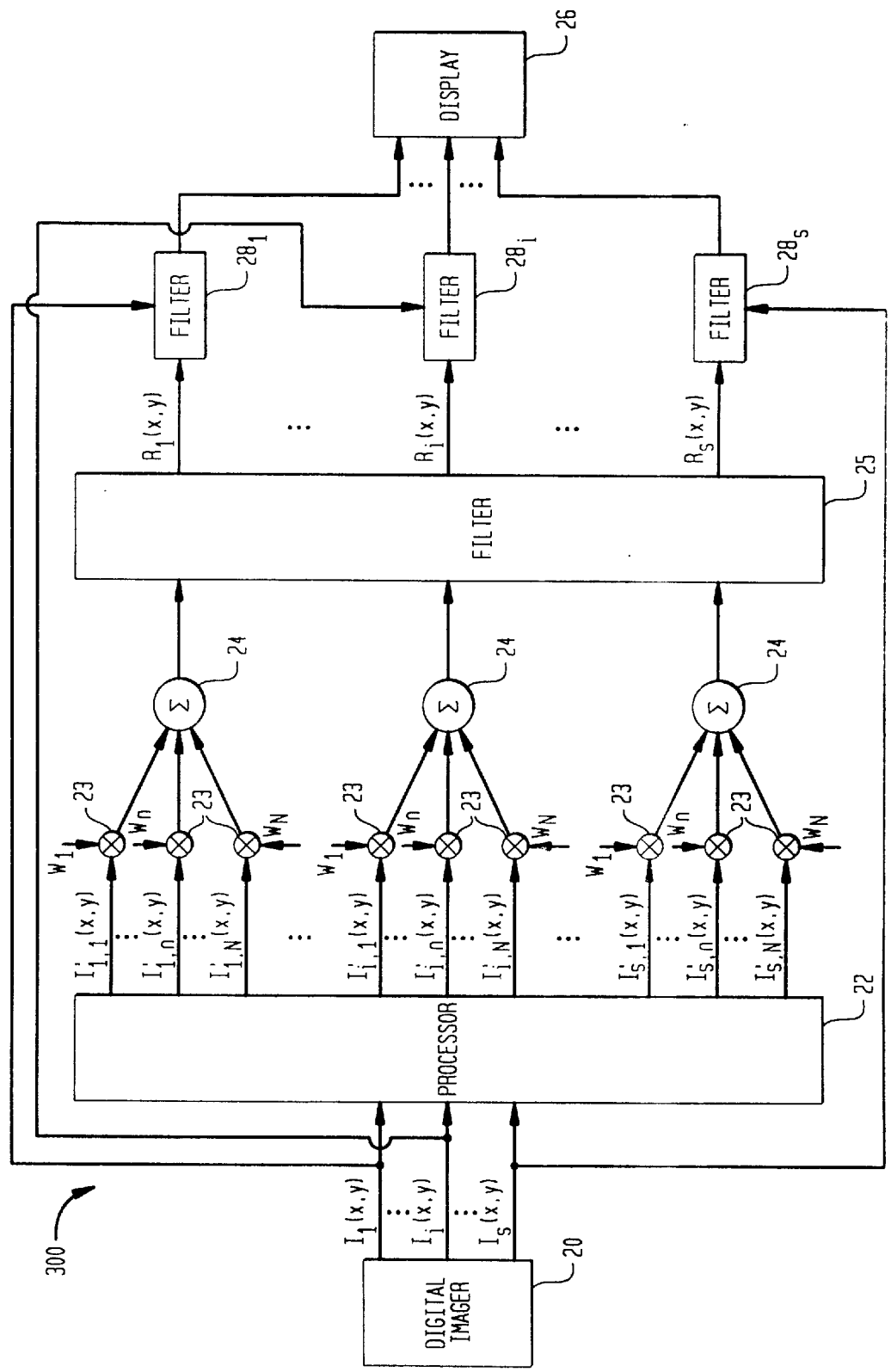

METHOD OF IMPROVING A DIGITAL IMAGE

STATEMENT OF GOVERNMENT INTEREST

This invention was made with Government support under contract NAS1-19603 awarded by NASA. The Government has certain rights in this invention.

FIELD OF THE INVENTION

The invention relates generally to image processing, and more particularly to a method of improving the dynamic range compression, color constancy and color rendition for a digital image.

BACKGROUND OF THE INVENTION

When compared to the direct observation of scenes, color images in general have two major limitations due to scene lighting conditions. First, the images captured and displayed by photographic and electronic cameras suffer from a comparative loss of detail and color in shadowed zones. This is known as the dynamic range problem. Second, the images are subject to color distortions when the spectral distribution of the illuminant changes. This is known as the color constancy problem. (Note that for non-color imaging including non-optical imaging, the problem becomes simpler and is largely one of dynamic range compression, i.e., the capture and representation of detail and lightness values across wide ranging average signal levels that can vary dramatically across a scene.)

Electronic cameras based upon CCD detector arrays are quite capable of acquiring image data across a wide dynamic range on the order to 2500:1. This range is suitable for handling most illumination variations within scenes, and lens aperture changes are usually employed to encompass scene-to-scene illumination variations. Typically though, this dynamic range is lost when the image is digitized or when the much narrower dynamic range of print and display media are encountered. For example, most images are digitized to 8-bits/color band (256 gray levels/color band) and most display and print media are even more limited to a 50:1 dynamic range.

A commonly encountered instance of the color constancy problem is the spectral difference between daylight and artificial (e.g., tungsten) light which is sufficiently strong to require photographers to shift to some combination of film, filters and processing to compensate for the spectral shift in illumination. Though film photographers can attempt to approximately match film type to spectral changes in lighting conditions, digital cameras must rely strictly on filters. However, these methods of compensation do not provide any dynamic range compression thereby causing detail and color in shadows to be lost or severely attenuated compared to what a human observer would actually see.

Another problem encountered in color and non-color image processing is known as color/lightness rendition. This problem results from trying to match the processed image with what is observed and consists of 1) lightness and color "halo" artifacts that are especially prominent where large uniform regions of an image abut to form a high contrast edge with "graying" in the large uniform zones, and 2) global violations of the gray world assumption (e.g., an all-red scene) which results in a global "graying out" of the image.

Since human vision does not suffer from these various imaging drawbacks, it is reasonable to attempt to model machine vision based on human vision. A theory of human vision centered on the concept of a center/surround retinex was introduced by Edwin Land in "An Alternative Technique for the Computation of the Designator in the Retinex Theory of Color Vision," Proceedings of the National Academy of Science, Volume 83, pp. 3078–3080, 1986. Land drew upon his earlier retinex concepts disclosed in "Color Vision and The Natural Image," Proceedings of the National Academy of Science, Volume 45, pp. 115–129, 1959, but harmonized these with certain findings of the neurophysiology of vision. All of the retinex concepts were intended to be models for human color perception. The earlier retinex concepts involved "random walks" across image space and the resetting of the computation when color boundaries were crossed. Land's 1986 retinex concept of human vision was proposed as a center/surround spatial computation where the center was 2–4 arc-minutes in diameter and the surround was an inverse square function with a diameter of about 200–250 times that of the center.

The application of Land's human vision theories to image processing has been attempted in the prior art. For example, to mimic the dynamic range compression of human vision, a detector array with integrated processing in analog VLSI silicon chips used a logarithm transformation prior to the surround formation. See "Analog VLSI and Neural Systems," C. Mead, Addison-Wesley, Reading, Mass., 1989. In an attempt to improve color constancy, the implementation of a color retinex in analog VLSI technology is suggested by Moore et al., in "A Real-time Neural System for Color Constancy," IEEE Transactions on Neural Networks, Volume 2, pp. 237–247, March 1991. In Moore et al., the surround function was an exponential and final processing before display of the image required the use of a variable gain adjustment that set itself by finding the absolute maximum and minimum across all three color bands' signal values. However, none of the prior art have developed an image processing technique that simultaneously accomplishes/improves dynamic range compression, color independence from the spectral distribution of the scene illuminant, and color/lightness rendition.

SUMMARY OF THE INVENTION

Accordingly, it is an object of the present invention to provide a method of improving an image created with digital data for both color and non-color images.

Another object of the present invention to provide a method of improving a digital image in terms of dynamic range compression, color independence from the spectral distribution of the scene illuminant, and color/lightness rendition.

Still another object of the present invention to provide a method of improving a digital image so that the image appears similar to what is perceived by human vision in all kinds and levels of lighting across the entire scene.

Other objects and advantages of the present invention will become more obvious hereinafter in the specification and drawings.

In accordance with the present invention, a method of improving a digital image is provided. The image is initially represented by digital data indexed to represent positions on a display. The digital data is indicative of an intensity value $I_i(x,y)$ for each position $(x,y)$ in each i-th spectral band. The intensity value for each position in each i-th spectral band is adjusted to generate an adjusted intensity value for each position in each i-th spectral band in accordance with $$\sum_{n=1}^{N} W_n(\log I_i(x, y) - \log[I_i(x, y) * F_n(x, y)]), i = 1, ..., S$$

where $W_n$ is a weighting factor, "*" is the convolution operator and S is the total number of unique spectral bands. For each n, the function $F_n(x,y)$ is a unique surround function applied to each position (x,y) and N is the total number of unique surround functions. Each unique surround function is scaled to improve some aspect of the digital image, e.g., dynamic range compression, color constancy, and lightness rendition. The adjusted intensity value for each position in each i-th spectral band is filtered with a common function. The improved digital image can then be displayed and is based on the adjusted intensity value for each i-th spectral band so-filtered for each position. For color images, a novel color restoration step is added to give the image true-to-life color that closely matches human observation.

BRIEF DESCRIPTION OF THE DRAWINGS

FIG. 3 is a schematic view of the system of FIG. 2 further improved to incorporate a color restoration processing capability in accordance with a third embodiment of the present method.

DETAILED DESCRIPTION OF THE INVENTION

Figure 1:
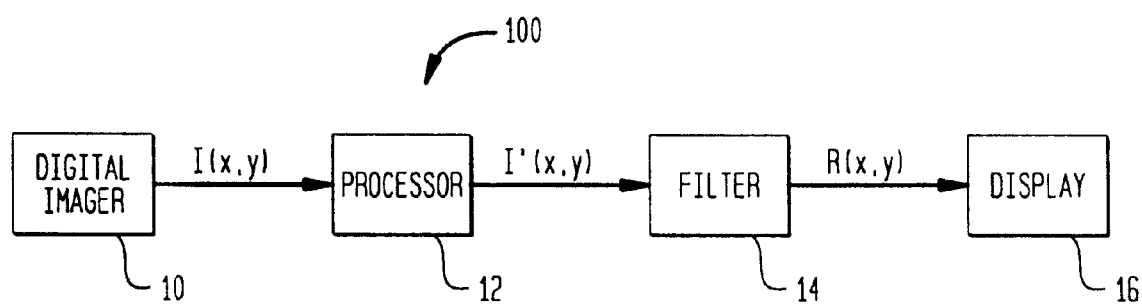
FIG. 1 is a schematic view of a system used to carry out a first embodiment of the method of the present invention in which an image can be improved in terms of dynamic range compression, lightness rendition, or a balance between these two image criteria.

Referring now to the drawings, and more particularly to FIG. 1, a system 100 is shown for carrying out a first embodiment of the present method. Using this embodiment of the method, the emphasis of image improvement can be placed on either the dynamic range compression, lightness rendition, or a balance between these two image performance criteria. By way of example, the first embodiment will be described as it relates to a non-color digital image. However, it is to be understood that the present method can be extended to color images as will be explained in detail below. System 100 consists of a digital imager 10, e.g., camera, capable of outputting image data in the form of digital data indexed to represent the intensity I at a particular position (x,y) in the image to be displayed on display 16. For purpose of the present invention, a "position" in the image is no larger than one pixel of display 16. However, by way of example, it will be assumed herein that each position (x,y) refers to a single row/column pixel position of display 16 which is a J-row by K-column display. The intensity of each pixel or I(x,y) is adjusted and filtered in accordance with the present method by processor 12 and filter 14 as will now be detailed.

On a pixel-by-pixel basis, processor 12 adjusts the intensity I(x,y) to yield I'(x,y) in accordance with $$I'(x,y) = \log I(x,y) - \log[I(x,y) * F(x,y)] \quad (1)$$

where F(x,y) is a surround function and "*" denotes the convolution operation. Note that prior art processing schemes adhering closely to natural vision science, i.e., an approximate log photoreceptor response, teach a general indifference with respect to the placement of the log response. However, if the logarithm function is taken before the surround function, the resulting discrete convolution of [log I(x,y)*F(x,y)] is equivalent to a weighted product of I(x,y) whereas the second term in equation (1) produces a weighted sum. This is closely related to the difference between the arithmetic mean and the geometric mean except that F(x,y) is selected so that $$k \int \int F(x,y) dx dy = 1 \quad (2)$$

which does not produce exactly the n-th root of n numbers as the geometric mean would. The value k is a normalization constant. Since the entire purpose of the log operation is to produce a point-by-point ratio to a large regional mean value, the form of equation (1) in the present method is critical for image processing.

The surround function F(x,y) must take into account "global" contributions at each pixel position while recognizing that each pixel position is most affected by "regional" contributions. To cover both of these contributions becomes the goal of the surround function. The preferred surround function for the present invention is of the Gaussian form $$F(x, y) = e^{\frac{-r^2}{c^2}} \quad (3)$$

where $$r = \sqrt{x^2 + y^2} \quad (4)$$

and c is a constant determining whether the adjustment of each pixel's intensity I(x,y) is optimized for either dynamic range compression or improved lightness rendition.

In general, constant c is selected to be in the approximate range of 1–50% of the largest (pixel) dimension of display 16. For example, if display 16 had a J by K resolution of 1024 by 768 pixels, the constant c would fall in the approximate range of 10 to 512. To emphasize dynamic range compression improvement, smaller values of c are used, i.e., in the approximate range of 1–20% of the larger of J or K. To emphasize lightness rendition improvement, larger values of c are used, i.e., in the approximate range of 40–50% of the larger of J or K. To compromise or achieve a balance between these two performance criteria, the constant c for this first embodiment is in the approximate range of 15–40% of the larger of J or K. Note that this middle range represents a reasonable compromise where shadows are fairly compensated and rendition achieves acceptable levels of image quality. This is qualitatively compatible with human visual perception in that the treatment of shadows is influenced by their spatial extent. Thus, larger shadows tend to be more compensated (less dark) while smaller shadows appear less compensated (blacker and with less visible internal detail). Thus, for narrow-dynamic images, a single-scale (i.e., single value for the constant c) retinex approach is generally sufficient.

The adjusted intensity value I'(x,y) must be filtered by filter 14 to yield the retinex output R(x,y) used by display 16. Filter 14 applies an offset and gain function to convert I'(x,y) from the logarithm domain to the digital domain of R(x,y) where it can be interpreted by display 16. For example, if display 16 is an 8-bit color monitor, filter 14 must convert each I'(x,y) to a digital value between 0 and 255. A great advantage of the present method is that filter 14 applies the identical offset and gain function to all pixels. Thus, the overall method is general in application for all images. This greatly simplifies the processing complexity and cost associated with digital image improvement.

It is readily apparent from equation (1) that color constancy, i.e., independence from single source illuminant spectral distribution, is reasonably complete since $$I(x,y) = D_S(x,y) D_R(x,y) \tag{5}$$

where $D_S(x,y)$ is the spatial distribution of the source illumination and $D_R(x,y)$ is the distribution of the scene reflectances. The associated retinex output $R(x,y)$ can also be written $$R(x, y) = \log \frac{D_S(x, y) D_R(x, y)}{D_{Savg}(x, y) D_{Ravg}(x, y)} \tag{6}$$

where the subscript "avg" denotes the spatially weighted average value of each term. As long as $D_S \approx D_{Savg}$, the contributions of spectral illumination cancel. Even for those cases where this is not strictly true, the reflectance ratio relation $\log(D_R/D_{Ravg})$ should dominate illumination variations. The above considerations hold true for each spectral band of an image.

Figure 2:
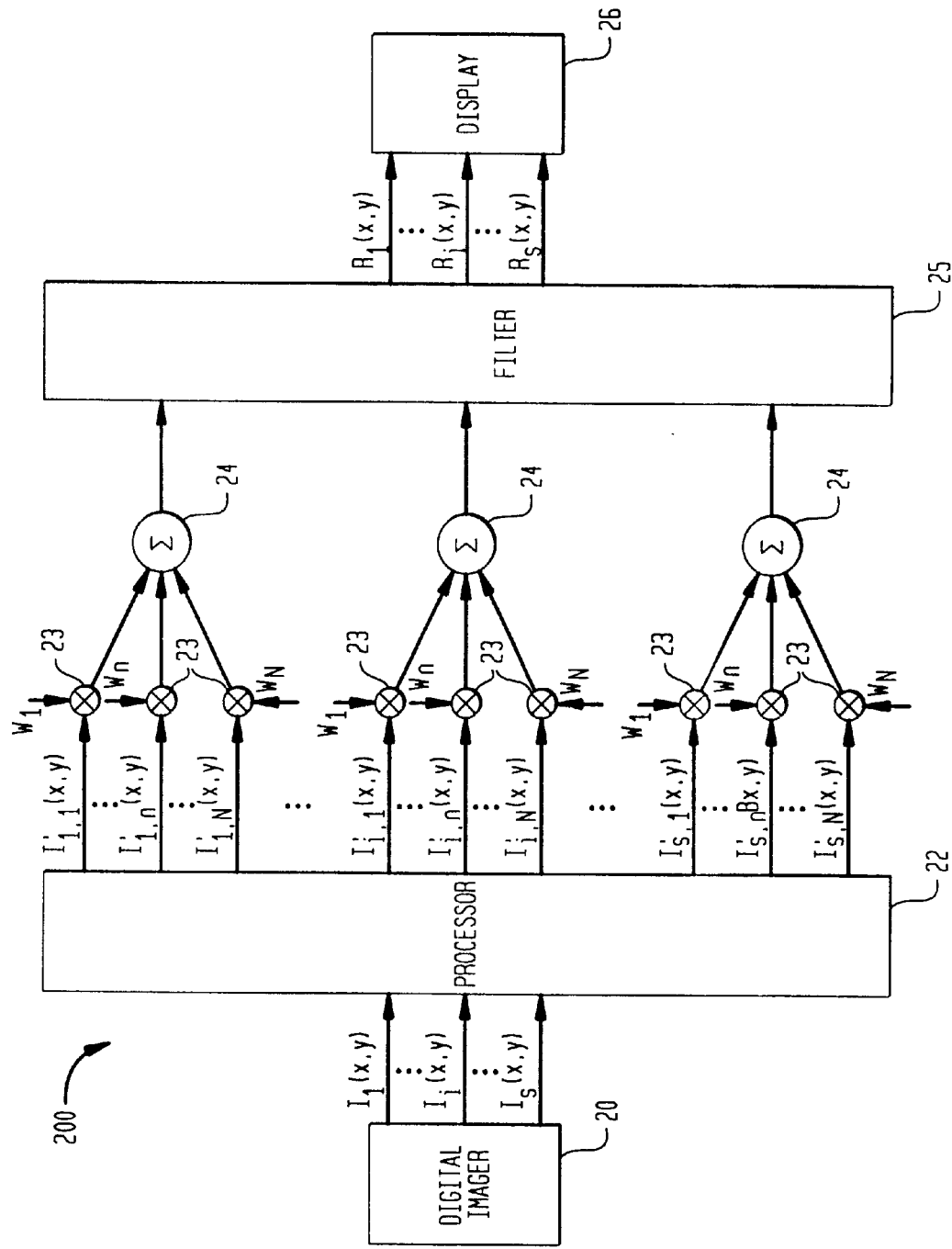
FIG. 2 is a schematic view of a system used to carry out a second embodiment of the method of the present invention in which an image is simultaneously improved in terms of both dynamic range compression and lightness rendition.

Referring now to FIG. 2, system 200 is shown for carrying out a second embodiment of the present method. In the second embodiment, it is possible to simultaneously improve both the dynamic range compression and lightness rendition of an image. By way of illustration, the second embodiment will be described as it relates to a color digital image although it could also be to used to improve non-color images. The operation of system 200 could include just the standard color triplet red, green, and blue. However, the present approach can be extended to any number of spectral bands that can be used to develop a color image. Accordingly, digital imager 20 is shown to output digital image data for each of the spectral bands at each position no larger than a pixel to be displayed on display 26. The intensity of each pixel for each i-th spectral band (e.g., $I_1(x,y), I_2(x,y), \ldots, I_i(x,y), \ldots, I_S(x,y)$) is available from digital imager 20 where S defines the total number of unique spectral bands.

Similar to the single-scale retinex approach described above, processor 22 applies equations (1), (3) and (4) on a pixel-by-pixel basis. However, unlike the single-scale approach, each pixel's intensity (in each spectral band) is adjusted a multiplicity of N times where the constant c is uniquely selected each n-th time the surround function $F(x,y)$ is applied to a pixel (of each spectral band). Thus, the preferred Gaussian surround function in equation (3) can be rewritten for the general case as $$F_n(x, y) = e^{\frac{-r^2}{c_n^2}} \tag{7}$$

where $c_n$ is a unique constant for each of the N applications of equation (1). In general, each value of c can be between approximately 1–50% of the larger pixel dimension of display 26 as described above. However, in this multi-scale approach, N unique values of $c_n$ can be used to adjust each pixel's intensity in each spectral band. For example, if N=3, the three values of $c_n$ could be selected such that the first constant $c_1$ optimized dynamic range compression, the second constant $c_2$ optimized rendition, and the third constant $c_3$ would be between the first and second constant values.

The resulting adjustments to intensity are each weighted by a factor $W_n$ at a multiplier 23 and then added together at a summer 24 for each spectral band. Thus, in general, the multi-scale method applied by processor 22, multipliers 23 and summers 24 can be written as $$\sum_{n=1}^{N} W_n (\log I_i(x, y) - \log[I_i(x, y) * F_n(x, y)]), i = 1, \ldots, S \tag{8}$$

where $W_n$ is the weighting factor, $F_n(x,y)$ represents the uniquely scaled (Gaussian) surround function governed by the choice of constant $c_n$ in equation (7), and S is the total number of unique spectral bands. The weighting factor $W_n$ can be a simple average, e.g., 1/N, that is the same for each $c_n$, or can be unique for each $c_n$ in order to emphasize certain performance criteria more than others for a particular application. Similar to the single-scale approach, the weighted sums output from summers 24 are all filtered by the same offset and gain function at filter 25 to convert the sums into digital data usable by display 26.

As noted above, the single-scale method is limited in its ability to combine dynamic range compression and lightness rendition and further cannot produce good color rendition for a pathological class of images, i.e., the so-called gray-world violations. However, the multi-scale aspect of the present invention synthesizes substantial dynamic range compression with good lightness rendition. Even so, the multi-scale retinex method by itself cannot produce good color rendition for images which violate the gray-world assumption. Thus, a third embodiment of the present invention adds color restoration to the method to achieve the missing capability. The color restoration method produces good color rendition with modest sacrifices in color constancy even for the class of images previously considered pathological. The multi-scale retinex method with color restoration can and has achieved a close approximation to human observation when test scenes are compared to processed images.

A system for implementing the method of color restoration is shown in FIG. 3 where system 300 depicts a modification of system 200 that incorporates the apparatus needed to implement the novel color restoration step. More specifically, each respective averaged sum for each spectral band output from one of multipliers 24 is further multiplied at a respective filter $28_1, \ldots, 28_i, \ldots, 28_S$ having a gain that takes the form $$\ln \left[ \frac{B I_i(x, y)}{\sum_{i=1}^{S} I_i(x, y)} \right] \tag{9}$$

where B is a constant that is the same for all spectral bands that controls the amount of perceived color saturation and S is a whole number indicative of the total number of spectral bands being used, e.g., S=3 for the standard triplet red, green, blue.

The present method can be embodied in a variety of applications. It can be used as a tool in computers for enhancement of images ex post facto. However, this embodiment is limited by the already restricted dynamic range of the typical 8-bit color digital image format. Experimental results indicate a significant useful capability for the enhancement of detail and color in poorly illuminated portions of scenes, automatic exposure correction for underexposed imagery, and correction of illuminant color defects such as tungsten illuminated scenes taken with daylight color film. Thus, the present method will find utility in digital photo-processing, image enhancement for different display media, and as a tool for personal/professional needs such as desktop publishing. This embodiment also has considerable potential for improving the commercialization of remote sensing data by providing an easily interpretable visual rendition.

A second embodiment would use the present method in special purpose processors designed for use with either 8-bit digital color cameras, or wide dynamic range (preferably 10–12 bit/color channel) color electronic cameras. In the wide dynamic range embodiment, the combined camera and processing performance would yield resulting images that approach human visual observation which readily brings out color and detail across very wide ranging illumination conditions (including within an image frame).

A third embodiment would use the present method in the development of smart color cameras with embedded computer chips. These chips which would perform the single or multi-scale retinex processing could be either analog or digital VLSI depending upon the relative performance at the time of design.

A fourth embodiment would use the present method in either a separate hardware processor or embedded computer chip for performing a retinex computation with low-light level electronic cameras which use thermoelectric or cryogenic coolers to reduce noise and increase sensitivity and dynamic range. This embodiment should produce high quality color images at low ambient light levels that would exceed human visual performance, i.e., specifically early-dawn/late-twilight/moonlight/dim-interior conditions.

The multi-scale approach can also be used in black and white imaging to accomplish dynamic range compression and tonal rendition. This has been tested on medical x-ray images and aerial photography and has achieved an improved visualization of anatomical features in x-rays and the removal of shading artifacts in aerial photography.

The advantages of the present invention are numerous. When implementing all of the features described herein, a comparison of the multi-scale retinex with color restoration with traditional image enhancement techniques (e.g., histogram equalization, simple gain/offset manipulation, and gamma non-linearities) shows that performance using the present method is far superior. Control parameters are independent of the input scene once the output is adjusted for a particular display device. Therefore, the process is robust and automatic.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of improving a digital image, comprising the steps of:
providing digital data indexed to represent positions on a display, said digital data being indicative of an intensity value $I_i(x,y)$ for each position (x,y) in each i-th spectral band;
adjusting said intensity value for said each position in each i-th spectral band to generate an adjusted intensity value for said each position in each i-th spectral band in accordance with $$\sum_{n=1}^{N} W_n(\log I_i(x, y) - \log[I_i(x, y) * F_n(x, y)]), i = 1, \ldots, S$$

where S is the number of unique spectral bands included in said digital data and, for each n, $W_n$ is a weighting factor and $F_n(x,y)$ is a unique surround function applied to said each position (x,y) and N is the total number of unique surround functions;
filtering said adjusted intensity value for said each position in each i-th spectral band with a common function; and
displaying an improved digital image based on said adjusted intensity value for each i-th spectral band so-filtered for said each position.

2. A method according to claim 1 wherein each said unique surround function is a Gaussian function.

3. A method according to claim 2 wherein said Gaussian function is of the form $$e^{\frac{-r^2}{c_n^2}}$$

satisfying the relationship $$k_n \int \int e^{\frac{-r^2}{c_n^2}} dx dy = 1$$

where $$r = \sqrt{x^2 + y^2}$$

and, for each n, $k_n$ is a normalization constant and $c_n$ is a unique constant for each of said N unique surround functions.

4. A method according to claim 1 further comprising the step of multiplying, prior to said step of displaying, said adjusted intensity value for said each position in each i-th spectral band by $$\ln\left[\frac{BI_i(x, y)}{\sum_{i=1}^{S} I_i(x, y)}\right]$$

where B is a constant.

5. A method according to claim 1 wherein said each position (x,y) defines a pixel of said display.

6. A method according to claim 1 wherein, for each n, $W_n=1/N$.

7. A method of improving a digital image, comprising the steps of:
providing digital data indexed to represent the positions of a plurality of pixels of a J-row by K-column display, said digital data being indicative of an intensity value I(x,y) for each of said plurality of pixels where x is an index of a position in the J-th row of said display and y is an index of a position in the K-th column of said display;
convolving said digital data associated with each of said plurality of pixels with a function $$e^{\frac{-r^2}{c^2}}$$

to form a discrete convolution value for each of said plurality of pixels, said function satisfying the relationship $$k \int \int e^{\frac{-r^2}{c^2}} dx\, dy = 1$$

where $$r = \sqrt{x^2 + y^2}$$

k is a normalization constant and c is a constant;

converting, for each of said plurality of pixels, said discrete convolution value into the logarithm domain;

converting, for each of said plurality of pixels, said intensity value into the logarithm domain;

subtracting, for each of said plurality of pixels, said discrete convolution value so-converted into the logarithm domain from said intensity value so-converted into the logarithm domain, wherein an adjusted intensity value is generated for each of said plurality of pixels;

filtering said adjusted intensity value for each of said plurality of pixels with a function that is identical for said plurality of pixels; and displaying an improved digital image based on said adjusted intensity value so-filtered for each of said plurality of pixels.

8. A method according to claim 7 wherein the value of said constant c is selected to be in the range of approximately 0.01 to approximately 0.5 of the larger of J and K.

9. A method of improving a digital image, comprising the steps of:

providing digital data indexed to represent the positions of a plurality of pixels of an J-row by K-column display, said digital data being indicative of an intensity value $I_i(x,y)$ for each i-th spectral band for each of said plurality of pixels where x is an index of a position in the J-th row of said display and y is an index of a position in the K-th column of said display;

convolving said digital data associated with each of said plurality of pixels in each i-th spectral band with a function $$e^{\frac{-r^2}{c_n^2}}$$

for n=2 to N to form N convolution values for each of said plurality of pixels in each said i-th spectral band, said function satisfying the relationship $$k_n \int \int e^{\frac{-r^2}{c_n^2}} dx\, dy = 1$$

where $$r = \sqrt{x^2 + y^2}$$

and, for each n, $k_n$ is a normalization constant and $c_n$ is a unique constant;

converting, for each of said plurality of pixels in each said i-th spectral band, each of said N convolution values into the logarithm domain;

converting, for each of said plurality of pixels in each said i-th spectral band, said intensity value into the logarithm domain;

subtracting, for each of said plurality of pixels in each said i-th spectral band, each of said N convolution values so-converted into the logarithm domain from said intensity value so-converted into the logarithm domain, wherein an adjusted intensity value is generated for each of said plurality of pixels in each said i-th spectral band based on each of said N convolution values;

forming a weighted sum for each of said plurality of pixels in each said i-th spectral band using said adjusted intensity values;

filtering said weighted sum for each of said plurality of pixels in each said i-th spectral band with a function that is identical for said plurality of pixels in each said i-th spectral band; and displaying an improved digital image based on said weighted sum so-filtered for each of said plurality of pixels in each said i-th spectral band.

10. A method according to claim 9 wherein the value for each said unique constant $c_n$ is selected to be in the range of approximately 0.01 to approximately 0.5 of the larger of J and K.

11. A method according to claim 9 further comprising the step of multiplying, prior to said step of displaying, said weighted sum for said each of said plurality of pixels in each said i-th spectral band by $$\ln\left[\frac{BI_i(x,y)}{\sum_{i=1}^{S} I_i(x,y)}\right]$$

where B is a constant and S is a whole number greater than or equal to 2 and defines the total number of spectral bands included in said digital data.

12. A method of improving a digital image, comprising the steps of:

providing digital data indexed to represent positions on a display, said digital data being indicative of an intensity value $I_i(x,y)$ for each position (x,y) in each i-th spectral band;

adjusting said intensity value for said each position in each i-th spectral band to generate an adjusted intensity value for said each position in each i-th spectral band in accordance with $$\sum_{n=1}^{N} W_n(\log I_i(x,y) - \log[I_i(x,y) * F_n(x,y)]), \; i = 1, \ldots, S$$

where S is a whole number greater than or equal to 2 and defines the total number of spectral bands included in said digital data and, for each n, $W_n$ is a weighting factor and $F_n(x,y)$ is a unique surround function of the form $$e^{\frac{-r^2}{c_n^2}}$$

satisfying the relationship $$k_n \int\int e^{\frac{-r^2}{c_n^2}} dx\,dy = 1$$

where $$r = \sqrt{x^2 + y^2}$$

and, for each n, $k_n$ is a normalization constant and $c_n$ is a unique constant where N is the total number of unique surround functions;

filtering said adjusted intensity value for said each position in each i-th spectral band with a common function;

multiplying said adjusted intensity value for said each position in each i-th spectral band by $$\ln\left[\frac{BI_i(x,y)}{\sum_{i=1}^{S} I_i(x,y)}\right]$$

where B is a constant; and displaying an improved digital image based on said adjusted intensity value for each i-th spectral band so-filtered and so-multiplied for said each position.

13. A method according to claim 12 wherein, for each n, $W_n = 1/N$.

14. A method according to claim 12 wherein the value for each said unique constant $c_n$ is selected to be in the range of approximately 0.01 to approximately 0.5 of the larger of J and K.

* * * * *